United States Patent [19]

Ikata et al.

[11] Patent Number: 5,351,041
[45] Date of Patent: Sep. 27, 1994

[54] METHOD OF DATA COMMUNICATION IN COMMUNICATION NETWORK ON AUTOMOBILE

[75] Inventors: Yoshikatsu Ikata; Yasunao Gou; Toshiyuki Kimura; Hiroshi Shimotsuma, all of Kawagoe, Japan

[73] Assignee: Pioneer Electronic Corporation, Tokyo, Japan

[21] Appl. No.: 782,382

[22] Filed: Oct. 24, 1991

[30] Foreign Application Priority Data

Oct. 25, 1990 [JP] Japan .................................. 2-288215
Oct. 25, 1990 [JP] Japan .................................. 2-288218

[51] Int. Cl.$^5$ .............................................. H04J 3/02
[52] U.S. Cl. .......................... 340/825.24; 340/825.06; 340/825.13; 370/85.1; 455/343
[58] Field of Search ..................... 340/825.24, 825.22, 340/825.06, 825.07, 825.09, 825.13, 825.25, 825.54, 825.08, 825.1, 825.11, 825.12, 825.5; 370/85.1, 85.3, 85.2, 92, 85.8, 95.2, 109; 455/343, 38.3; 371/32, 33

[56] References Cited

U.S. PATENT DOCUMENTS

| | | | |
|---|---|---|---|
| 4,584,684 | 4/1986 | Nagasawa et al. | 371/33 |
| 4,689,786 | 8/1987 | Sidhu et al. | 370/85.1 |
| 4,691,202 | 9/1987 | Denne et al. | 340/825.5 |
| 4,698,748 | 10/1987 | Juzswik et al. | 455/343 |
| 4,970,506 | 11/1990 | Sakaida et al. | 370/109 |
| 5,121,386 | 6/1992 | Wolfsgruber et al. | 370/85.1 |
| 5,224,152 | 6/1993 | Harte | 455/343 |
| 5,241,542 | 8/1993 | Natarajan et al. | 455/38.3 |
| 5,276,680 | 1/1994 | Messenger | 455/38.3 |

Primary Examiner—John K. Peng
Assistant Examiner—Andrew Hill
Attorney, Agent, or Firm—Kane, Dalsimer, Sullivan, Kurucz, Levy, Eisele and Richard

[57] ABSTRACT

A communication network, such as an audiovisual system, on an automobile has a master unit and a plurality of slave units which are connected to a common communication bus. When the communication network starts operating, connection confirmation request information is transmitted from the slave units to the master unit. The master unit awaits connection confirmation request information from at least one of the slave units for a predetermined period of time after the communication network starts operating. Thereafter, the predetermined period of time is extended if the reception of connection confirmation request information from all the slave units that were connected when the connection network stopped operating in a preceding cycle is not completed. If reception acknowledgement information from the master unit is not detected for a predetermined period of time, then the slave units automatically enter a low power consumption mode.

11 Claims, 20 Drawing Sheets

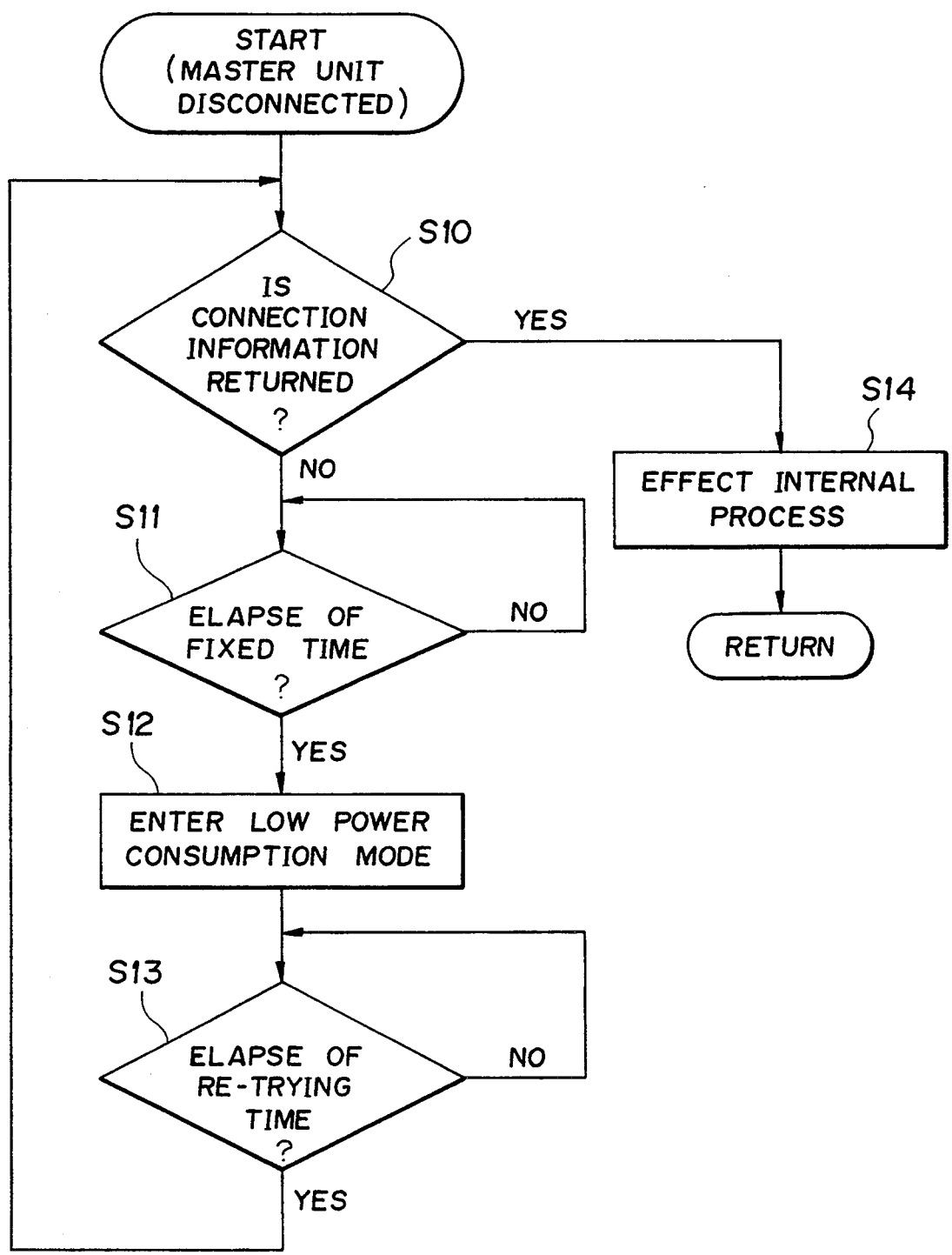

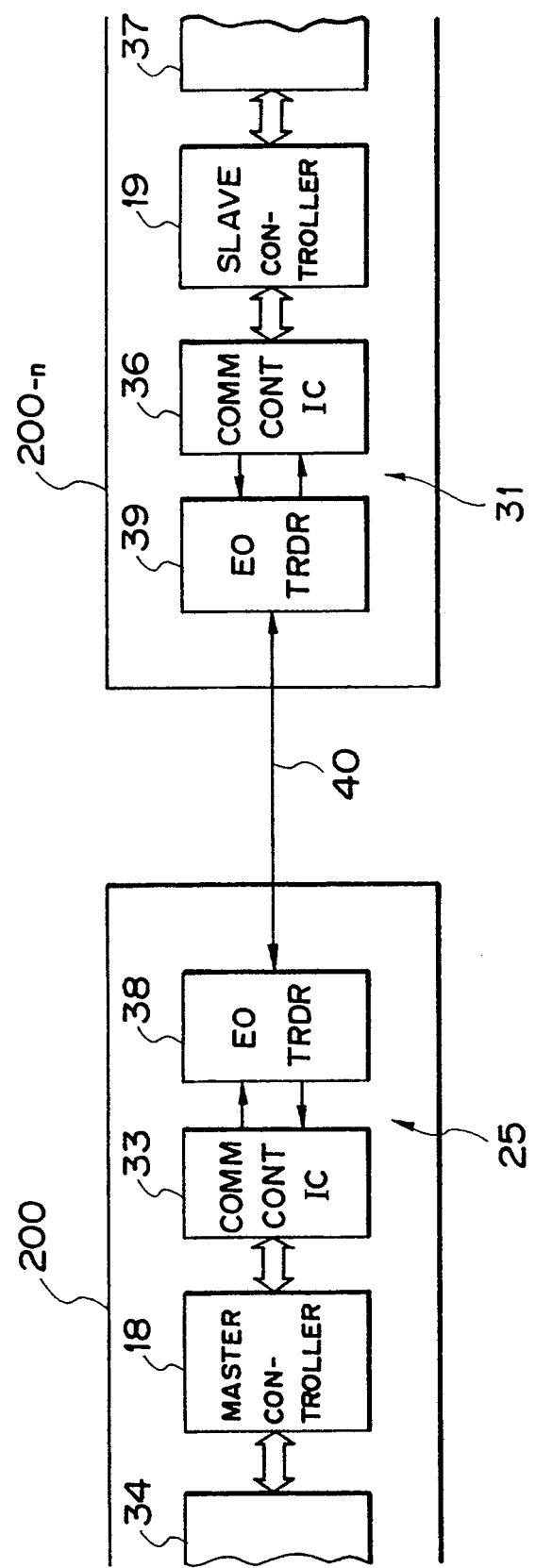

FIG. 7

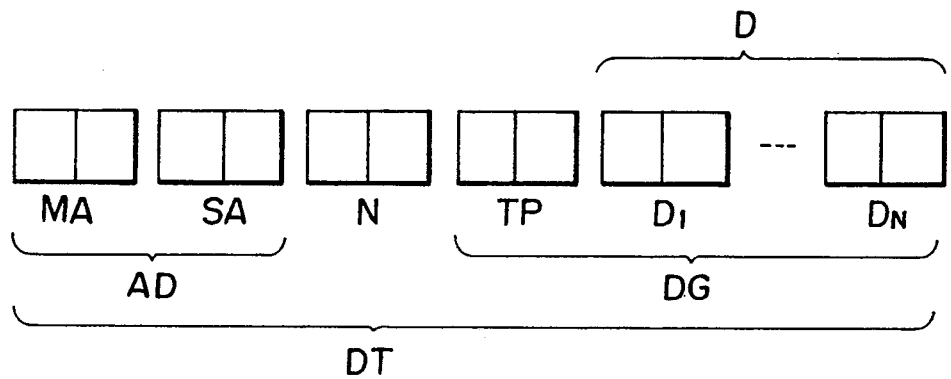

FIG. 8

| TP | CLASSIFI-CATION | FUNCTION·MEANING |
|---|---|---|
| 0H | CONNECTION CONFIRMATION DATA | TRANSFER OF DATA OF CONNECTION CONFIRMING OPERATION |
| 1H | STATUS INFORMATION | TRANSFER OF STATUS INFORMATION |
| 2H | KEY DATA | TRANSFER OF KEY DATA FROM KEY TO MASTER |
| 3H | KEY COMMAND | TRANSFER OF KEY COMMAND FROM MASTER TO SLAVE |
| 4H | SYSTEM COMMAND | TRANSFER OF COMMAND TO CONFIRM ACKNOWLEDGEMENT·OPERATION COMPLETION |
| 5H | SPECIAL COMMAND | TRANSFER OF OTHER THAN KEY COMMAND AND SYSTEM COMMAND |
| 6H | DISPLAY DATA | TRANSFER OF DISPLAY DATA |
| 7H | REFRESH | MASTER CONFIRMS STATUS OF SOURCE |
| 8H | MEMORY DATA | TRANSFER CONTENTS OF MEMORY |
| 9H | UNDEFINED | |
| AH | RETURN DATA | RETURN OF CHECK SUM RESULTS |
| BH | UNDEFINED | |
| CH | UNDEFINED | |
| DH | UNDEFINED | |
| EH | UNDEFINED | |
| FH | UNDEFINED | |

FIG. 9

| MAJOR CLASS. | SUB-CLASS. | FORMAT | MEANING |
|---|---|---|---|
| 2H | 0H | DEDICATED KEY CODE | SENDING OF PRODUCT KEY CODE |
| | 1H | REMOTE CONTROL CODE | SENDING OF REMOTE CONTROL DATA |
| | 2H | KEY COMMAND | SENDING OF BUS COMMAND |
| | 3H | | |
| 0H | 0H | STANDARD FORMAT | |
| | 1H | EXTENDED FORMAT | TRANSFER OF GRAPHIC DATA |
| | | | |
| | | | |
| AH | 0H | — | CHECK SUM NG |
| | 1H | — | CHECK SUM OK |

FIG. 10

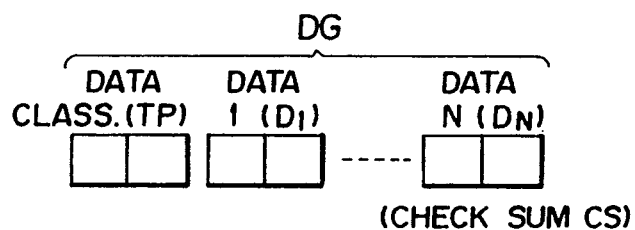

| FORMAT | TP | DATA STRUCTURE | | CHECK SUM |
|---|---|---|---|---|
| FORMAT FOR CONFIRMING CONNECTION | 00 | PS LA LA ----- LA ; SLAVE→MASTER | | CS |
| | 00 | PS LA -- LA PA PS LA -- LA ; MASTER→SLAVE | | CS |
| FORMAT FOR KEYS, DISPLAY DATA, ETC. | 10 | PS TL LN LS LS LM | | CS |
| | 20 | | KEY | CS |
| | 30 | TP : CLASSIFICATION<br>PS : PHYSICAL STATUS<br>PA : PHYSICAL ADDRESS<br>LS : LOGICAL STATUS<br>LA : LOGICAL ADDRESS<br>LM : LOGICAL MODE<br>TL : TALKER ADDRESS<br>LN : LISTENER ADDRESS | COMMAND | CS |
| | 40 | | COMMAND | CS |
| | 50 | | COMMAND | CS |
| | 60 | | DISPLAY | CS |
| | 70 | | COMMAND | |
| | 80 | | MEMORY DATA | |
| FORMAT FOR TRANSMITTING CHECK SUM RESULTS | A0 | | | CS |

FIG. 11

| P ADDRESS | | FUNCTION | L ADDRESS | | P ADDRESS | | FUNCTION | L ADDRESS | |
|---|---|---|---|---|---|---|---|---|---|
| 0 | 0 | MASTER AND OTHER FUNCTIONS | * | * | 1 | 0 | | | |
| 0 | 1 | DISPLAY (0) | 0 | 1 | 1 | 1 | DISPLAY (1) | 1 | 1 |
| 0 | 2 | AUDIO (0) | 0 | 2 | 1 | 2 | AUDIO (1) | 1 | 2 |
| 0 | 3 | CASSETTE TAPE DECK | 0 | 3 | 1 | 3 | | 1 | 3 |
| 0 | 4 | SINGLE CD PLAYER | 0 | 4 | 1 | 4 | | 1 | 4 |
| 0 | 5 | TV TUNER | 0 | 5 | 1 | 5 | | 1 | 5 |
| 0 | 6 | MULTIPLE CD PLAYER (0) | 0 | 6 | 1 | 6 | MULTIPLE CD PLAYER (1) | 1 | 6 |
| 0 | 7 | FM/AM TUNER | 0 | 7 | 1 | 7 | | 1 | 7 |
| 0 | 8 | DAT | 0 | 8 | 1 | 8 | | 1 | 8 |
| 0 | 9 | EXTERNAL COMMANDER | 0 | 9 | 1 | 9 | | 1 | 9 |
| 0 | A | NAVIGATION SYSTEM | 0 | A | 1 | A | | 1 | A |
| 0 | B | | 0 | B | 1 | B | | 1 | B |
| 0 | C | RDS | 0 | C | 1 | C | | 1 | C |
| 0 | D | CD-ROM DECODER | 0 | D | 1 | D | | 1 | D |
| 0 | E | | 0 | E | 1 | E | | 1 | E |
| 0 | F | | 0 | F | 1 | F | | 1 | F |

FIG.12

| P ADDRESS | | FUNCTION | L ADDRESS | |
|---|---|---|---|---|
| 2 | 0 | | | |
| | | | | |
| 2 | 1 | CASSETTE TAPE DECK | 0 | 3 |
| | | AM/FM TUNER | 0 | 7 |
| 2 | 2 | SINGLE CD PLAYER | 0 | 4 |
| | | AM/FM TUNER | 0 | 7 |
| 2 | 3 | TV TUNER | 0 | 5 |
| | | FM/AM TUNER | 0 | 7 |
| 2 | 4 | DISPLAY | 0 | 1 |
| | | EXTERNAL COMMANDER (KEY) | 0 | 9 |
| 2 | 5 | | | |
| | | | | |
| 2 | 6 | | | |
| | | | | |
| 2 | 7 | | | |
| | | | | |
| 2 | 8 | | | |
| | | | | |

FIG.13

| ADDRESS | | FUNCTION | ADDRESS | | FUNCTION |
|---|---|---|---|---|---|
| 0 | 0 | MASTER (SOURCE SWITCHING·CONNECTION) | 1 | 0 | |
| 0 | 1 | DISPLAY (0) | 1 | 1 | |
| 0 | 2 | AUDIO (0) | 1 | 2 | AUDIO (1) |
| 0 | 3 | CASSETTE TAPE DECK | 1 | 3 | |
| 0 | 4 | SINGLE CD PLAYER | 1 | 4 | |
| 0 | 5 | TV TUNER | 1 | 5 | |
| 0 | 6 | MULTIPLE CD PLAYER (0) | 1 | 6 | MULTIPLE CD PLAYER (1) |
| 0 | 7 | FM/AM TUNER | 1 | 7 | |
| 0 | 8 | DAT | 1 | 8 | |
| 0 | 9 | EXTERNAL COMMANDER (WIRED REMOTE CONT) | 1 | 9 | |
| 0 | A | NAVIGATION SYSTEM | 1 | A | |
| 0 | B | | 1 | B | |
| 0 | C | RDS | 1 | C | |
| 0 | D | CD-ROM DECODER | 1 | D | |
| 0 | E | | 1 | E | |
| 0 | F | | 1 | F | |

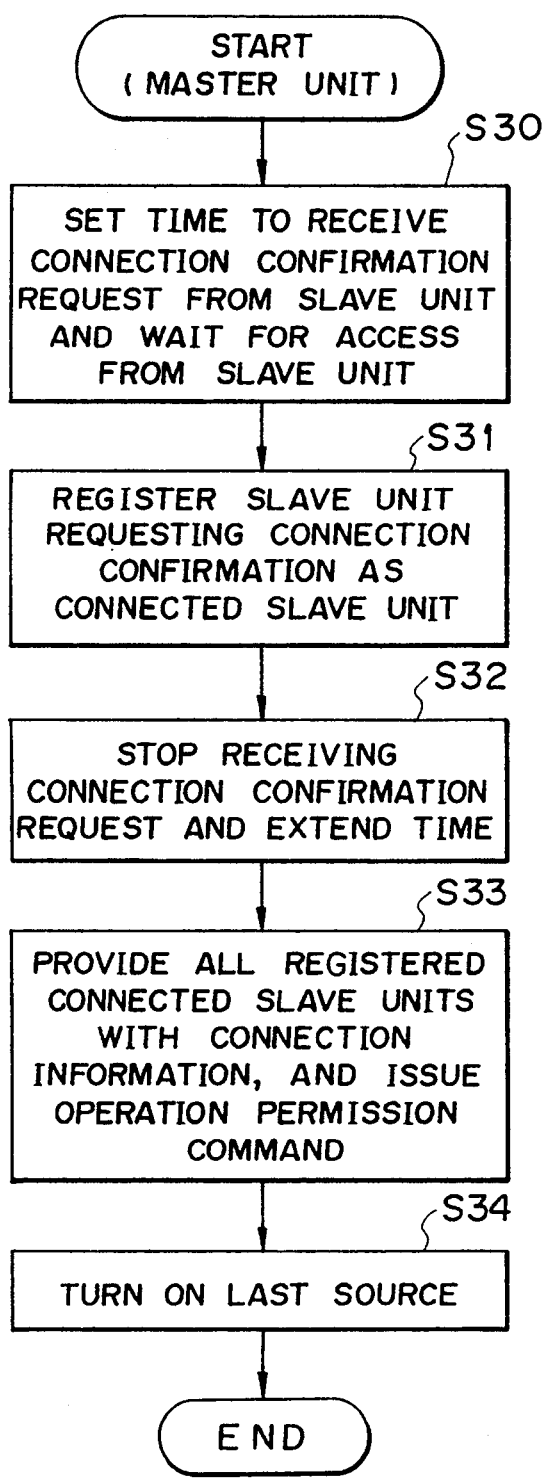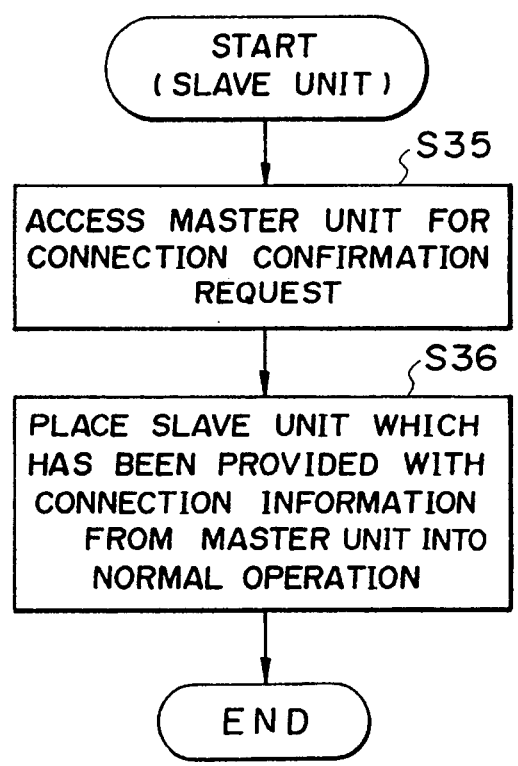

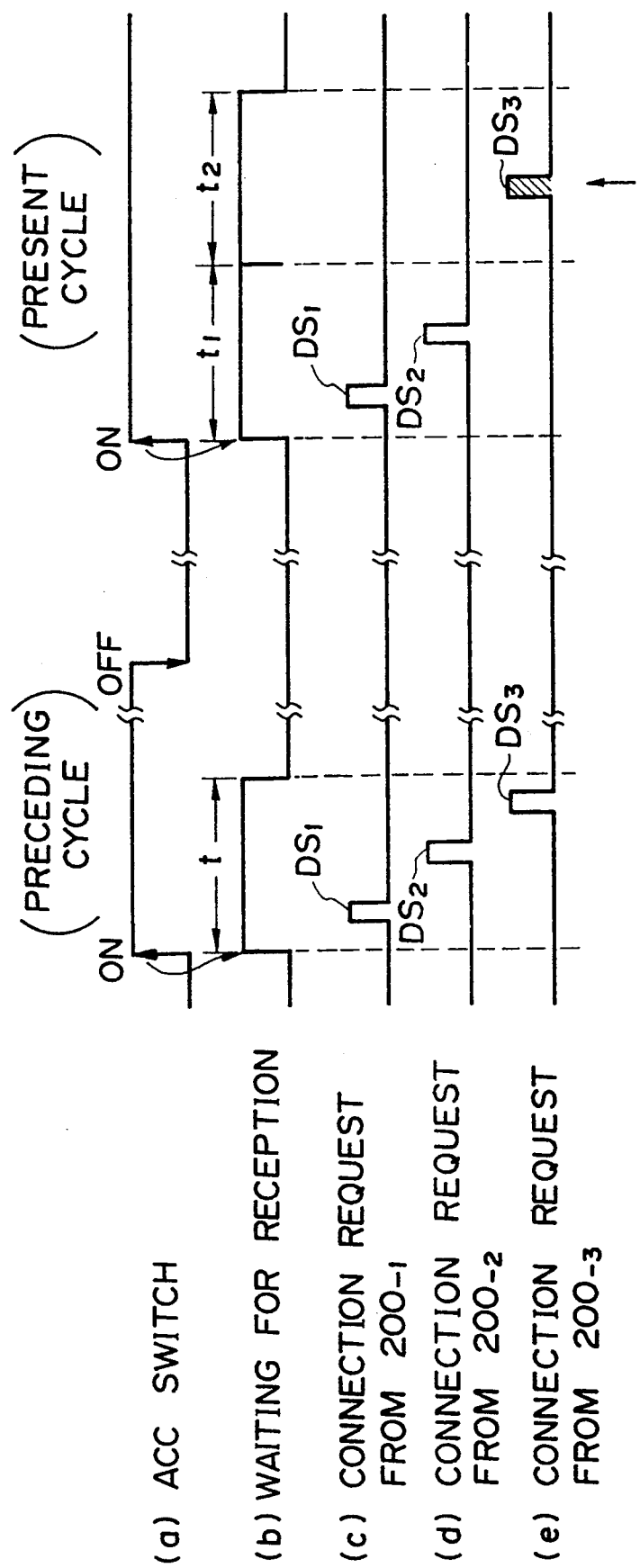

F I G. 20
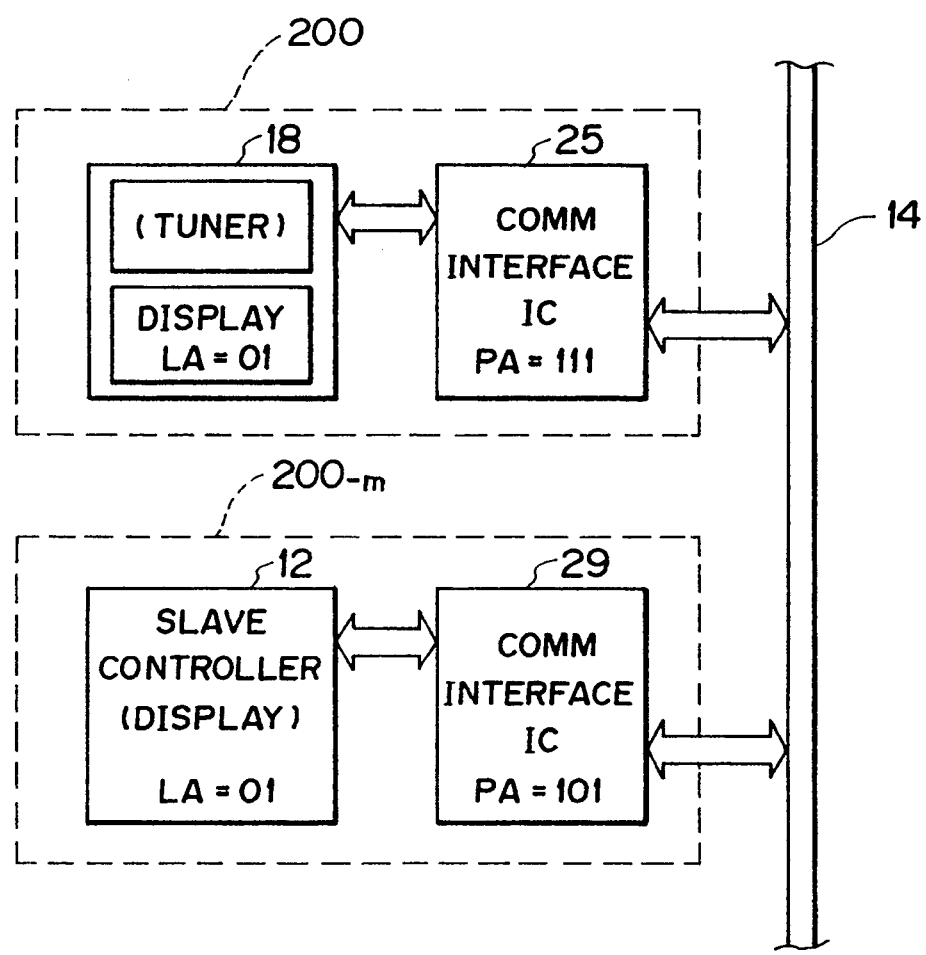

METHOD OF DATA COMMUNICATION IN COMMUNICATION NETWORK ON AUTOMOBILE

BACKGROUND OF THE INVENTION

1. Field of the Invention

The present invention relates to a method of data communication in a communication network on an automobile, and more particularly to a method of data communication in a network of components of an audiovisual system on an automobile.

2. Description of the Prior Art

In recent years, automobile audio systems have been changing from systems which give a user only audio information such as music to systems which allow the user to enjoy both audio and visual information. Systems with both audio and visual capabilities are known as audiovisual systems.

Automobile audio systems on automobiles are composed of many different audio and visual components. The audio components include a cassette tape deck, a radio tuner, a CD (compact disk) player, etc., while the visual components include a TV (television) tuner, a navigation system, etc. Audio signals produced by some of these components are amplified by an amplifier and reproduced from loudspeakers in the automobile. Video signals produced by other components are displayed on a display unit in the automobile. Today, the audiovisual system components are controlled according to digital technology, i.e., by respective controllers in the form of microcomputers.

The components of an audiovisual system are required to be controlled systematically for systematic operation of the components. To meet this requirement, the controllers of the respective components are connected by a communication bus network, so that control data for the components will be transmitted through the communication bus.

In the conventional audiovisual system network, the controllers of the components are controlled by a polling process. According to the polling process, either one of the controllers is given a priority status and handled as a master unit, with the other controllers as slave units, and when the master unit is to collect data from a slave unit, the master unit always accesses the slave unit, i.e., initiates the transfer of the data from the slave unit.

When the master unit transmits communication data to a slave unit for access or the slave unit transmits data back to the master unit, it is necessary that the controllers be identified or specified. For this purpose, the controllers are allotted respective address indicating themselves.

Heretofore, the controllers are allotted respective unique addresses. Control data which are to be given to controllers comprise address data peculiar to the respective controllers and instruction data (e.g., start command: ON data) added to the address data. The control data which are generated are sent to the communication bus.

In networks with communication buses, one master unit is necessarily connected to a communication bus. If the master unit fails for some reason, then it can no longer transmit a polling signal to the communication bus. In the event of the trouble, the slave units regard the master unit as failing upon detection of no polling signal within a predetermined period of time, disable themselves, enter a low power consumption mode, and stand by in that mode. When the master unit recovers from the failure or a new master unit is connected to the communication bus, the master unit sends a polling signal to access the slave units which have been standing by in the low power consumption mode.

Each time an ACC switch (car accessory power supply switch) assembled together with an engine start keyswitch on an automobile is turned on or off, the audiovisual system on the automobile is also turned on or off. Therefore, the connection status of the slave units of the network has to be confirmed each time the ACC switch is turned on. According to the polling process, each time the ACC switch is turned on, the master unit has to access the individual slave units for confirming their connection, and hence is placed under a very large burden. For example, if each of the slave units has a 12-bit address, then the master unit has to access the slave units 4096 times at maximum provided the master unit confirms the connection of the slave units to the communication bus through its serial port.

In order for the master unit to access the slave units according to the polling process, it is necessary for the master unit to register the addresses of all the slave units connected to the communication bus. Any additional slave unit whose address has not been registered by the master unit cannot be accessed by the master unit even if the additional slave unit is physically or electrically connected to the communication bus. Therefore, to access the additional slave unit reliably, the additional slave unit should be allotted its own unique address, and that address should be newly registered by the master unit.

One solution would be for the slave units to access the master unit to request for the confirmation of a connection through a self report, The master unit would establish times to receive access signals from the slave units. Since, however, the slave units are enabled at different times, a slave unit which was connected when confirmed previously and which is to be connected this time might not be connected and might possibly be disconnected because the times to receive access signals from the slave units are fixed.

In the above system, when the master unit fails for some reason and then recovers from the malfunction, the system may not recover automatically. If the malfunctioning condition of the master unit continues, then the slave units consume electric energy wastefully.

SUMMARY OF THE INVENTION

It is an object of the present invention to provide a method of data communication in a communication network on an automobile, which method allows slave units to be connected reliably when they access a master unit to request for the confirmation of a connection.

Another object of the present invention is to provide a method of data communication in a communication network on an automobile, including a master unit and a plurality of slave units that access that master unit to request the confirmation of a connection, which method can lower energy consumption and reliably get the entire system back to normal operation when a master unit fails and then restores again.

According to the present invention, there is provided a method of data communication in a communication network on an automobile, including a master unit and at least one slave unit which is connected to a common communication bus, the method comprising the steps of transmitting connection confirmation request information from the slave unit to the master unit when the communication network starts operating, controlling the master unit to await connection confirmation request information from the slave unit for a predetermined period of time after the communication network starts operating, and thereafter, extending the predetermined period of time if the reception of connection confirmation request information from the slave unit that was connected when the connection network operating in a preceding cycle is not completed.

According to the present invention, there is also provided a method of data communication in a communication network on an automobile, including a master unit and at least one slave unit which is connected to a common communication bus, the method comprising the steps of transmitting connection confirmation request information from the slave unit to the master unit, transmitting reception acknowledgement information from the master unit to the slave unit in response to reception of the connection confirmation request information from the slave unit, and controlling the slave units to enter a low power consumption mode in response to detection of no reception acknowledgement information from the master unit for a predetermined period of time.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 1A, 1B, and 1C are diagrams illustrative of the principles of the present invention.

FIG. 6 is a block diagram of another specific arrangement in which a master unit and a slave unit are connected to each other.

FIG. 7 is a diagram of a transfer format of communication data.

FIG. 8 is a diagram of major classification data.

FIG. 9 is a diagram of subclassification data.

FIG. 10 is a diagram of basic data formats.

FIG. 11 is a diagram showing physical addresses.

FIG. 12 is a diagram showing physical addresses.

FIG. 13 is a diagram showing logical addresses.

FIGS. 15A and 15B are flowcharts of a communication sequence when a power supply is turned on, respectively.

FIG. 17 is a diagram showing a manner in which the reception of data is awaited.

FIG. 20 is a diagram showing a communication process by way of example.

DETAILED DESCRIPTION OF THE PREFERRED EMBODIMENTS

Figure 1A:
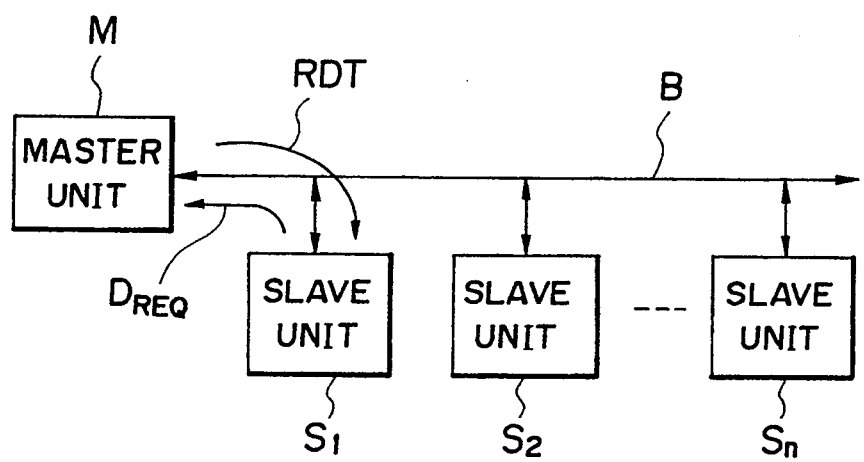

As shown in FIG. 1A, a master unit M and one or more slave units $S_1-S_n$ are connected to a common communication bus B of a communication network on an automobile.

Figure 1B:
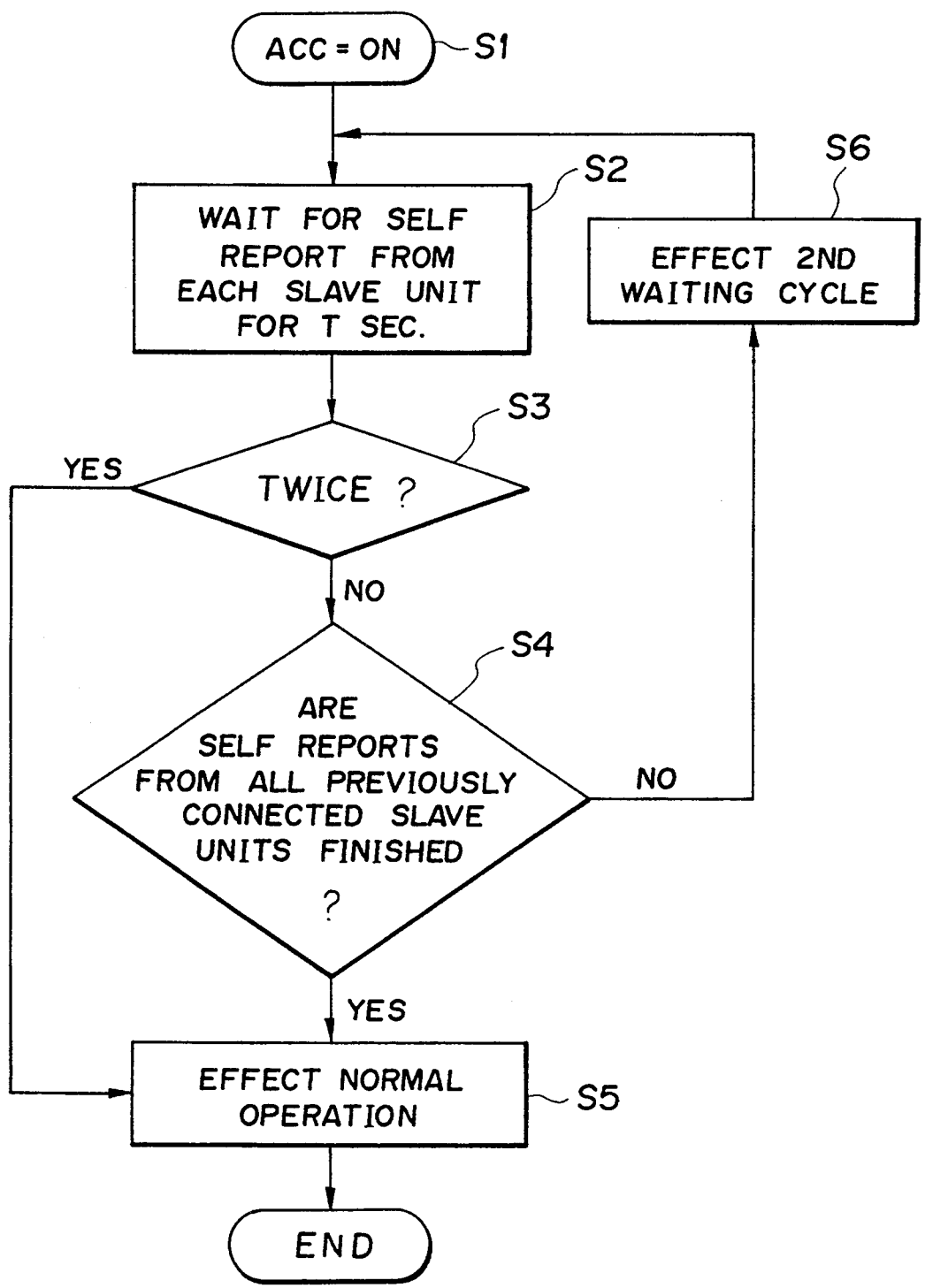

According to the present invention, as shown in FIG. 1B, when the communication network starts operating in response to the turning-on of an ACC switch on the automobile in step S1, the slave units $S_1-S_n$ transmits information for requesting the confirmation of a connection of their own, i.e., connection confirmation request information, as a self report to the master unit M. The master unit M waits for connection confirmation request information from the slave units $S_1-S_n$ for a fixed period of time (T sec.) after the communication network has started to operate in step S2. If the reception of connection confirmation request information from all the slave units which were connected at the time the communication network stops operating in a preceding cycle is not completed in step S4, then the master unit M extends the period of time to wait for the reception in steps S6, S2 and S3.

More specifically, each slave unit transmits its own connection confirmation request information as a self report to the master unit when the communication network is started (e.g., the ACC switch is turned on) in step S1. During a fixed period of time (T) from the start of the communication network, the master unit waits for connection confirmation request information as a self report from the slave units in step S2. After elapse of the fixed period of time (T), the master unit confirms whether the reception of a self report from all the slave units that were connected when the communication network stopped operating in a preceding cycle (e.g., when the ACC switch was turned off) is completed or not in step S4. Such a confirmation may be carried out by storing, in a memory, addresses of the slave units which were connected when the communication network stopped operating in the preceding cycle and comparing the stored addresses with the addresses of those slave units from which a self report has actually been transmitted to the master unit M. If the reception of a self report from all the slave units which were connected in the preceding cycle is not completed, then the master unit awaits for another fixed period of time in steps S6, S2 and S3. That is, if the self reports from all previously connected slave units is not completed in step S4, a second waiting cycle is performed in step S6 to await for another fixed period of time in step S2. For example, after the waiting time is once extended to wait for another fixed period of time in step S3, the process goes to step 5 in which a normal operation is effected.

Since the time required to wait for the reception of a self report is extended, any slave units which have actually been connected are not regarded as being disconnected due to different times or rates at which the slave units start operating when the communication network is started.

According to the present invention, furthermore, as shown in FIGS. 1A and 1C, the slave units $S_1-S_n$ initially transmit connection confirmation request information $D_{REQ}$ of their own to the master unit M. After having receiving the connection confirmation request information $D_{REQ}$, the master unit M issues information RDT, acknowledging the reception of the connection confirmation request information $D_{REQ}$, to the slave units $S_1$-$S_n$ in step S10. At that time, if the reception acknowledgement information RDT from the master unit M is interrupted for a predetermined period of time in step S11, the slave units $S_1$-$S_n$ place themselves in a low power consumption mode in step S12.

Then, after elapse of a predetermined period of time in step S13, the slave units $S_1$-$S_n$ transmit connection confirmation request information again to the master unit M to discriminate whether there is a reception acknowledgement or not in step S10. In step S10, if there is the reception acknowledgement, then the slave units $S_1$-$S_n$ effect internal process in step S14 and the process go back to a normal operation.

POWER SUPPLY OF AUDIOVISUAL SYSTEM

Figure 2:
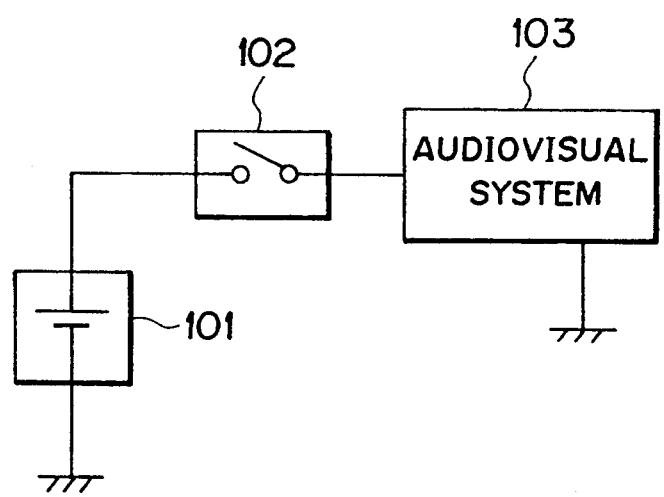
FIG. 2 is a block diagram of a power supply circuit for an audiovisual system.

The principles of the present invention are particularly useful when embodied in an audiovisual (AV) system on an automobile. As shown in FIG. 2, the audiovisual system, denoted at 103, is supplied with electric energy from a battery 101 through an ACC switch 102. The ACC switch 102 is assembled together with an engine start keyswitch of the automobile. When the engine key inserted in the engine start key switch is turned to the position of the ACC switch, the accessories on the automobile are energized by the battery 101. Therefore, the audiovisual system 103 is turned on or off each time the engine key is turned in the engine start keyswitch.

ARRANGEMENT OF AUDIOVISUAL SYSTEM

Figure 3:
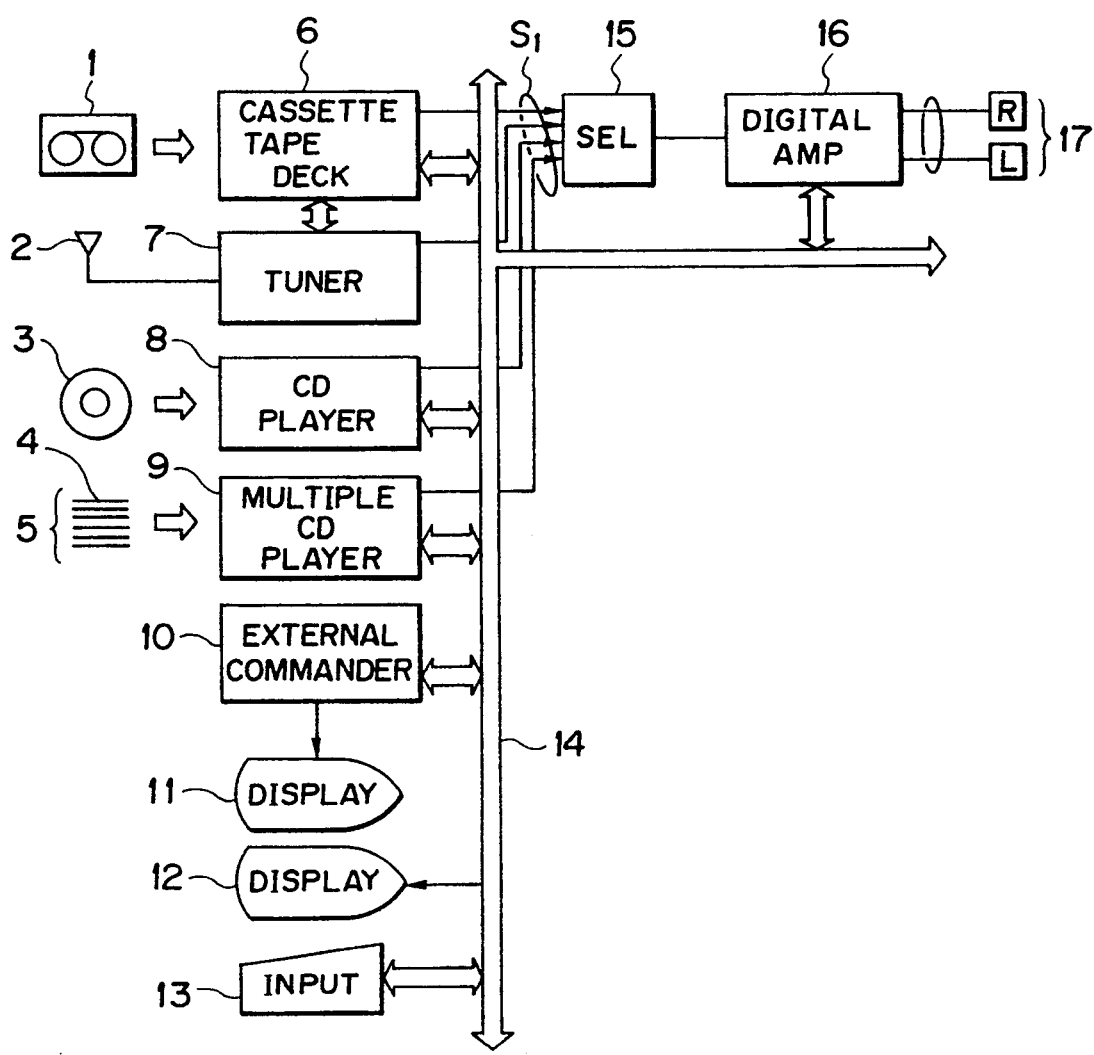
FIG. 3 is a block diagram of an audiovisual system.

FIG. 3 shows a detailed systematic arrangement of the audiovisual system. The audiovisual system has audio reproducing components and visual reproducing components. The audio reproducing components include a cassette tape deck 6 for reproducing recorded audio signals from a cassette tape 1, a tuner 7 such as an AM/FM tuner for reproducing radio signals which are received by an antenna 2, a CD player 8 for reproducing recorded signals from a CD 3, and a multiple CD player 9 having an automatic CD changer 5 for reproducing recorded signals from multiple CDs 4. The visual reproducing components include a TV tuner contained in the tuner 7, for reproducing TV signals received by the antenna 2, and a display unit 12 for displaying image based on the TV signals and also displaying still images based on signals from the CD player 8 if a CD-ROM is played back by the CD player 8. Typically, a CD-ROM is employed by a navigation system. The audiovisual system has an external commander 10 which is in the form of a keyboard for entering various operation commands. A display unit 11 is connected to the external commander 10. The audiovisual system also has an input unit 13, which may be incorporated in the external commander 10.

The above components of the audiovisual system have respective controllers for controlling their own operation. These controllers are connected to each other through a communication bus 14, thereby making up a communication bus control network. The control network is shown in FIG. 4, and will be described in detail later on.

Reproduced signals from the audio reproducing components are selectively applied through a selector 15 to a digital amplifier 16. After the reproduced signal has been amplified by the digital amplifier 16, it is applied to loudspeakers 17 from which reproduced sounds are outputted. The digital amplifier 16 contains a digital signal processing circuit which is controlled by a controller in the digital amplifier 16, the controller being connected to the communication bus 14.

CONTROL NETWORK OF AUDIOVISUAL SYSTEM

Figure 4:
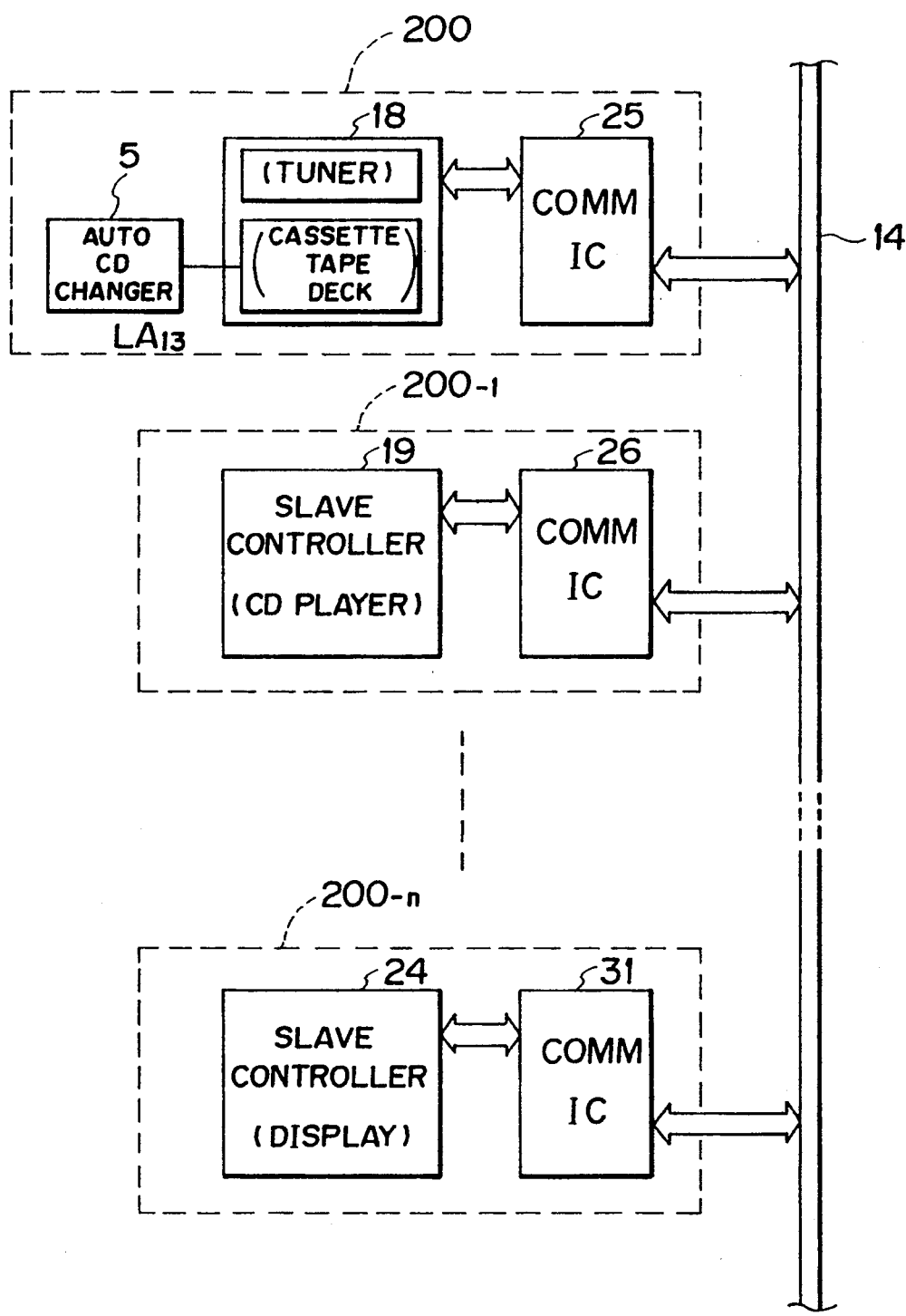
FIG. 4 is a block diagram of a control network of the audiovisual system.

FIG. 4 shows the control network in detail. For the purpose of description, the audiovisual system components connected to the communication bus 14 as shown in FIG. 3 will hereinafter be referred to as "units". As shown in FIG. 4, these units are connected to the communication bus 14 parallel to each other. Either one of these units is selected as a "master" unit, indicated by 200, for controlling the control network, while the other units serve as "slave" units, indicated by $200_{-1}$-$200_{-n}$.

The master unit 200 has a master controller 18 connected through a communication interface IC 25 to a communication bus 14. The master controller 18 includes controllers for controlling the cassette tape deck 6 and the tuner 7. The controller for the cassette tape back 6 also controls the automatic CD changer 5. The slave units $200_{-1}$-$200_{-n}$ have respective slave controllers 19~24 which are also connected to the communication bus 14 through respective communication interface ICs 26-31.

Figure 5:
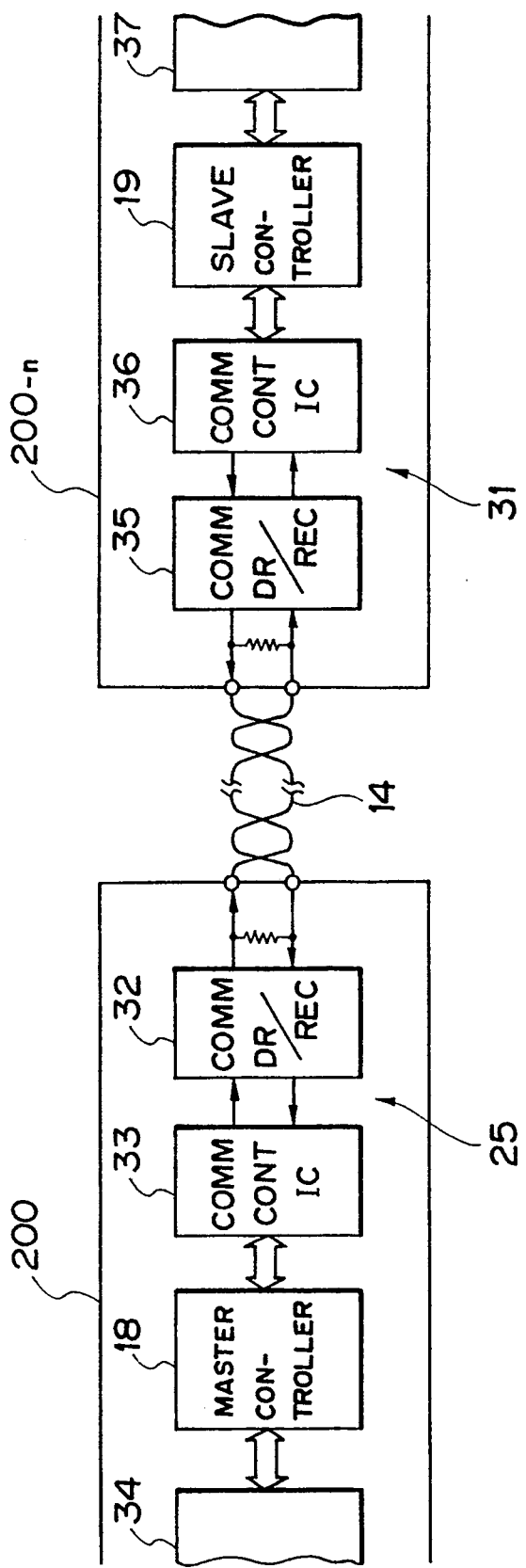
FIG. 5 is a block diagram of a specific arrangement in which a master unit and a slave unit are connected to each other.

FIG. 5 shows a specific arrangement in which the master unit 200 and the slave unit $200_{-n}$ are connected to each other. The master unit 200 and the slave unit $200_{-n}$ are connected to each other by the communication bus 14. The communication bus 14 comprises a twisted pair of conductors. Communication data DT transferred through the communication bus 14 is transmitted and received by the communication interface ICs 25, 26, . . . 31 of the master unit 200 and the slave unit $200_{-n}$, respectively. The communication interface IC 25 is divided into a communication driver/receiver 32 and a communication control IC 33. Likewise, the communication interface IC 31 is divided into a communication driver/receiver 35 and a communication control IC 36. Heretofore, the communication driver/receiver and the communication control IC have been integrally combined in one IC. The communication control IC 33 is composed of a CMOS transistor, while the communication driver/receiver 32 is composed of a bipolar transistor of high current-driven capability. The communication driver/receiver 35 and the communication control IC 36 are of the same structures as the communication driver/receiver 32 and the communication control IC 33, respectively.

The communication interface IC 25, for example, which is divided into the communication control IC 33 and the communication driver/receiver 32, is capable of coping with different transmission mediums for the communication bus 14. In FIG. 5, the communication bus 14 is composed of a twisted pair of conductors for differential transmission. If the communication bus 14 comprises an optical communication cable 40 as shown in FIG. 6, then the communication driver/receiver 32 shown in FIG. 5 may be replaced with an electro-optical transducer 38 with the communication control IC 33 remaining unchanged. Another advantage is that since the master unit 200 fails due primarily to disturbance noise entering from the communication bus 14, only the communication driver/receiver 32 will malfunction when an excessive signal is applied thereto from the communication bus 14, and replacing the malfunctioning communication driver/receiver 32 with a new one will restore the master unit 200. Consequently, the maintenance of the master unit 200 and also the slave unit $200_{-n}$ is relatively easy to carry out. The easy maintenance is particularly advantageous with audiovisual systems on automobiles because the master and slave units are exposed to noise induced by the automobile engines.

Furthermore, the fabrication of bipolar transistors and CMOS transistors according to different processes is easier and less expensive than the fabrication of Bi-CMOS ICs.

While only the communication interface IC 25 has been described above, each of the communication interfaces 26–31 of the other slave units $200_{-1}$–$200_{-n}$ is also divided into a communication control IC and a communication driver/receiver.

TRANSFER FORMAT OF COMMUNICATION DATA

FIG. 7 shows a transfer format of the communication data DT. As shown in FIG. 7, the communication data DT comprises, from its leading end, master address data MA indicating the address of the master unit 200, slave address data SA indicating the addresses of the slave units $200_{-1}$–$200_{-n}$, message length data N indicating the message length of data D, classification data TP indicating the type of the data D, and the data D itself which represents the contents to be transferred. The classification data TP and the data D form a data group DG to be transmitted and the master address data MA and the slave address data SA form address data AD.

The arrangement of the data D varies depending on the contents of the communication data DT, i.e., the classification data TP. There are roughly three formats for the data D. As shown in FIG. 10, a first format is a format for confirming a connection, a second format is a format for keys and display data, and a third format is a format for transmitting the result of a check sum CS. The format for confirming a connection, which is used when the communication data DT is transferred from the slave units $200_{-1}$–$200_{-n}$ to the master unit 200, differs from that which is used when the communication data DT is transferred from the master unit 200 to the slave units $200_{-1}$–$200_{-n}$. In the format for keys and display data as shown in FIG. 10, data ranging from physical status data PS indicating a status (e.g. physical mode) of each unit to logical mode data LM are all identical, and omitted from illustration.

Talker address data TL indicates the address of a transmitting side (talker) which transmits the communication data DT.

Listener address data LN indicates the address of a receiving side (listener) which receives the communication data DT.

Logical status data LS represents the status of the function corresponding to each logical address LA.

Logical mode data LM represents the operation status (mode) of the function corresponding to each logical address LA.

The chuck sum data CS is data for detecting an added error to improve the reliability of the data D.

The classification data TP is positioned at the leading end of the communication data DT, and is a data area indicating the type of the data D following the classification data TP. The classification data TP is composed of major classification data and subclassification data. As shown in FIG. 8, the major classification date represents the type of the data D. If the entire classification data TP is of 8 bits, then the major classification data is allotted four high-order bits. As shown in FIG. 9, the subclassification data is mainly used to identify the format of the data D, and is allotted four low-order bits.

Figure 14:
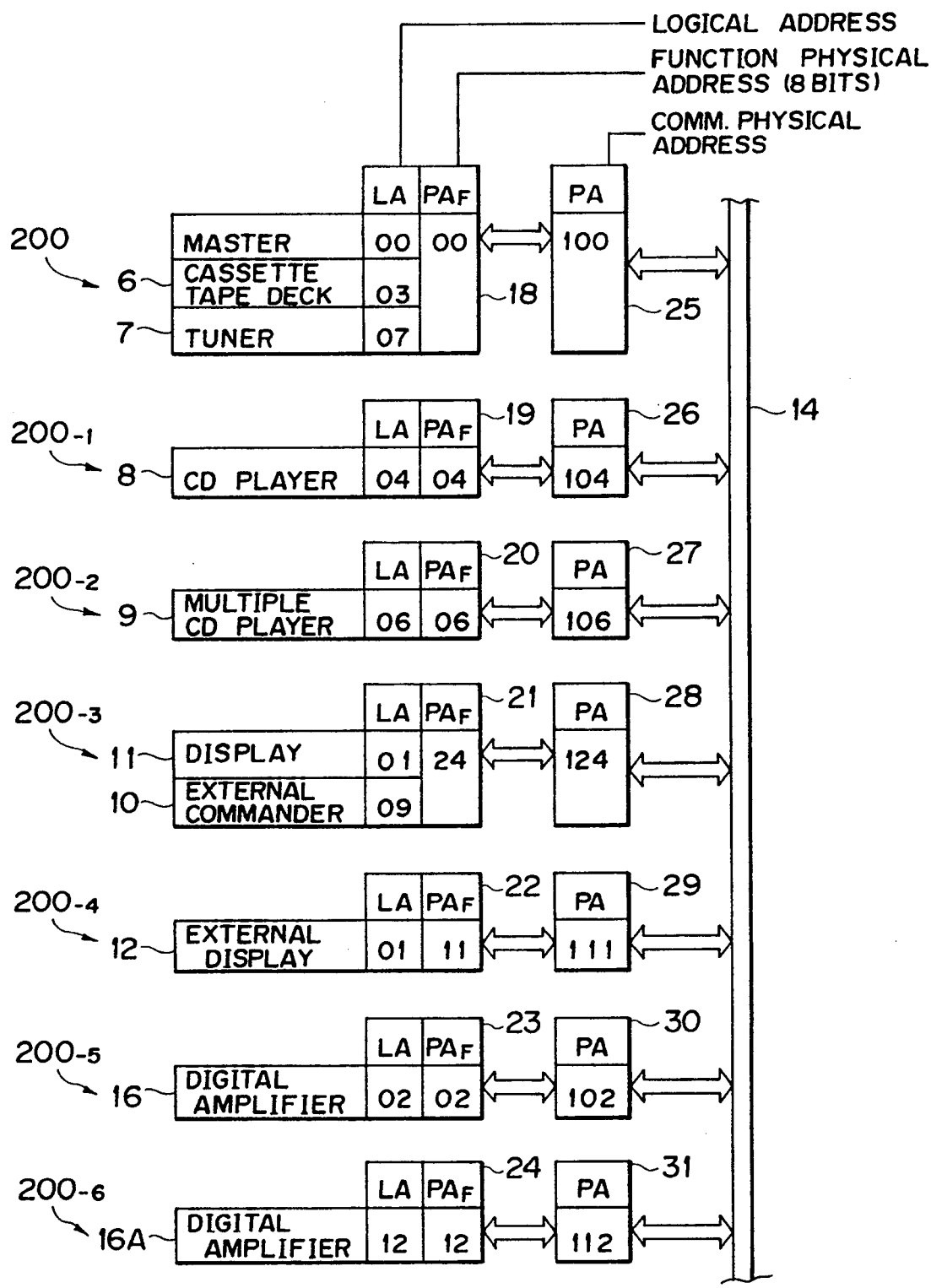
FIG. 14 is a diagram illustrative of an example in which physical and logical addresses are assigned.

As illustrated in FIGS. 11 and 12, the physical address data PA represents communication addresses for specifying the communication interface ICs 25–31 of the master unit 200 and the slave units $200_{-1}$–$200_{-n}$ on the communication bus 14, the addresses indicating the master unit 200 and the slave units $200_{-1}$–$200_{-n}$. The physical address data PA for specifying the master unit 200 is fixed at all times. Basically, one unit is allotted one physical address data PA. FIG. 14 shows an example in which the units shown in FIG. 4 are allotted physical address data. In FIG. 14, the physical address data PA are established for the master and slave controllers 18–24. This is because there is a case that two functional elements, such as the cassette tape deck 6 and the tuner 7, are connected to one master controller 18. If one controller has one function, then the physical address data PA and the logical address data LA indicate the same address.

The physical status data PS represents status information about the master unit 200 and the slave units $200_{-1}$–$200_{-n}$, and includes data indicative of the number of function addresses (i.e., the logical address data LA, described below) that the units have.

As shown in FIG. 13, the logical address data LA is data indicative of each of the functions (i.e., the tuner and the cassette tape deck) possessed by the master unit 200 and the slave units $200_{-1}$–$200_{-n}$. The logical address data LA is assigned to each function. The number of logical address data LA is not fixed because there are as many logical address data LA (e.g., $LA_1$, $LA_2$, ... ) as there are functions possessed by the controller that is determined by the physical address data PA. FIG. 14 also shows the logical address data LA assigned to the units shown in FIG. 4.

In more detail, communication ICs 25–31 have communication physical addresses PA. Each of the master and slave units 200, $200_{-1}$, ... $200_{-6}$ has a function physical address PAF and the logical address LA. The master controller 18 includes two controllers for controlling the cassette tape deck 6 and the tuner 7, and, therefore, two logical addresses LA are assigned to those two controllers. Similarly, a controller of the slave unit $200_{-3}$ includes a display controller and an external commander controller and, therefore, a logical address is assigned to each controller. In case that each of the controllers of slave units as shown in the units $200_{-1}$, $200_{-2}$, $200_{-4}$, $200_{-5}$, $200_{-6}$ except the unit $200_{-3}$, has only one function, the logical address is equal to the function physical address.

COMMUNICATING OPERATION

Transmission of the communication data DT between the master unit 200 and the slave units $200_1$–$200_n$ of the audiovisual system will be described below.

In this network, the slave units send a self report about themselves to the master unit, unlike the conventional polling process. The master unit does not initially positively access the slave units.

A sequence for confirming a connection is generally composed of a communication sequence $SEQ_1$ when the power supply is turned on (i.e., the ACC switch is turned on), and a communication sequence SEQ$_2$ while the audiovisual system is being energized by the power supply (i.e., during normal operation of the audiovisual system).

Figure 18:
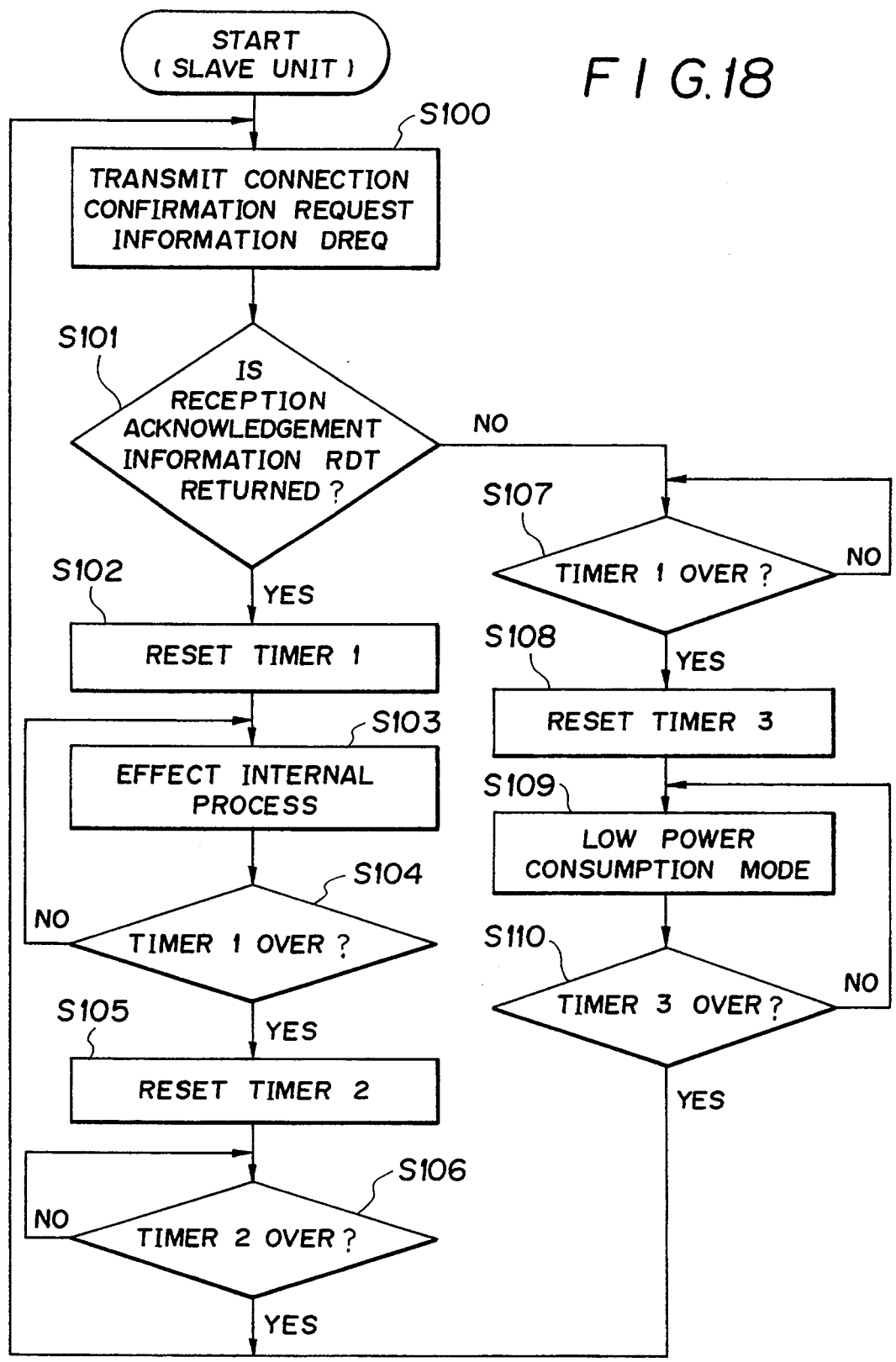
FIG. 18 is a flowchart of a processing sequence to be carried out when a master unit fails.

(1) The basic algorithm of the communication sequence SEQ$_1$ is as follows (for details, see FIGS. 15A and 15B):

After the turning-on the power supply has been detected, each slave unit accesses the master unit to request the confirmation of a connection. The master unit regards the slave units which have accessed the master unit, as connected slave units, and provides the slave units with the connection information after elapse of a predetermined period of time. That is, in FIG. 15A, time for receiving connection confirmation request from the slave unit is set in the master unit to wait for access from the slave unit in step S30. The slave unit accesses the master unit for connection confirmation request in step S35. If the master unit does not exist, the operation is stopped after elapse of a predetermined period of time. Then, the master unit 200 registers the slave unit which has requested for connection confirmation as a connected slave unit in step S31. After elapse of a predetermined period of time, the master unit 200 stops receiving connection confirmation request from the slave unit when the ACC switch is turned on in step S32. At this time, when the slave unit having been confirmed as being connected before the ACC switch is off is not confirmed as being connected, the receiving time is extended as shown in FIG. 18 which is described later in detail. The master unit 200 provides all registered connected slave units with connection information and outputs operation permission command in step S33. Then, the process goes to step S34 in which the last source, that is, the last component of the audiovisual system before the ACC switch is turned on, is turned on. Thereafter, the slave unit to which connection information has been given from the master unit 200 is placed into a normal operation in step S36.

Figure 16A:
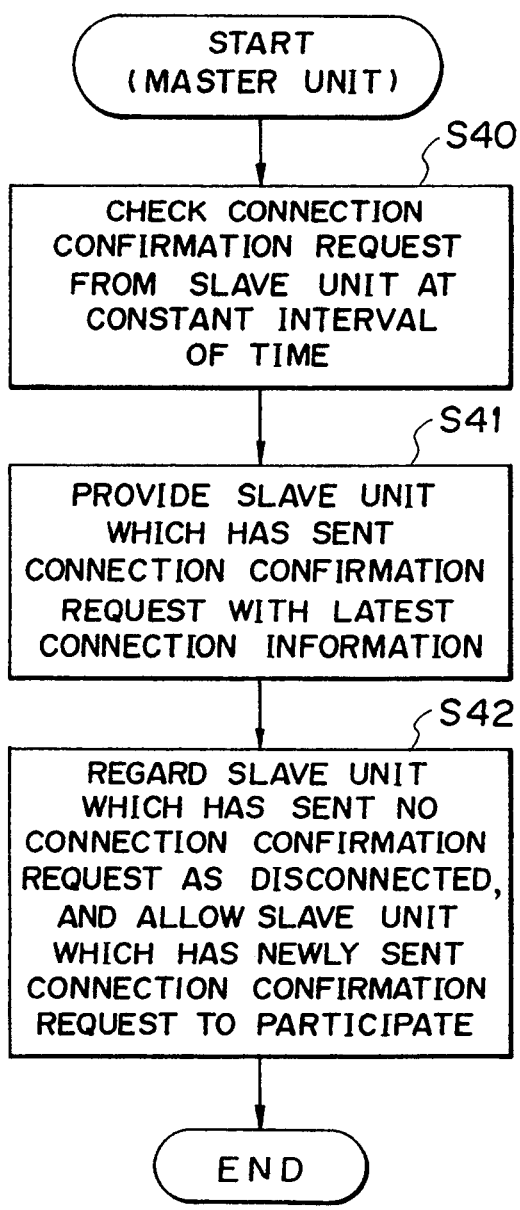
FIG. 16A and 16B are flowcharts of a communication sequence while the system is being energized by a power supply, respectively.
Figure 16B:
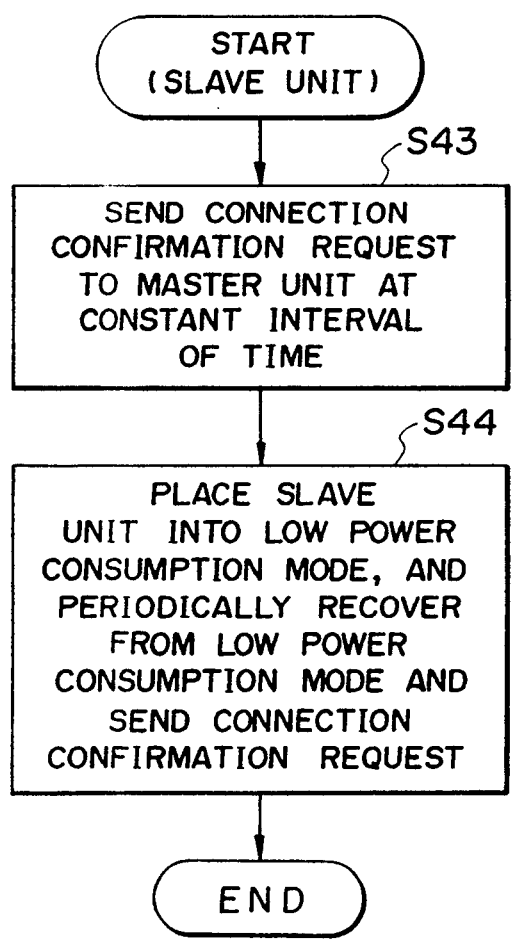

(2) The communication sequence SEQ$_2$ while the audiovisual system is being energized by the power supply includes a processing sequence SEQ$_3$ to be carried out when the slave units 200$_{-1}$-200$_{-n}$ are disconnected, and a unit 200$_m$ participates in the system. The basic algorithms processing sequence SEQ$_4$ to be carried out when a new slave of these processing sequences are as follows (for details, see FIGS. 16A and 16B):

(2-1) The processing sequence SEQ$_3$

Each slave unit sends a request for confirming a connection to the master unit at each interval of time. In response to the request, the master unit provides latest connection information at all times. The master unit regards any slave unit which has sent no request for confirming a connection, as being disconnected from the communication bus, performs necessary internal processing, and provides the other slave units with (latest) connection information which indicates the disconnected slave unit.

That is, in step S40, the master unit 200 checks connection confirmation request from the slave unit at a constant interval of time, and the slave unit sends connection confirmation request to the master unit 200 at a constant interval of time in step S43. The master unit 200 provides the slave unit having sent connection confirmation request with the latest connection information in step S41. The master unit 200 regards the slave unit having sent no connection confirmation request as having been disconnected and allow the slave unit having newly sent connection confirmation request to participate in the communication system in step S42.

In this case, the master unit 200 positively provides connection information with all slave units. In case that no response is given to the slave unit, due to a communication failure, although the slave unit sends connection confirmation request to the master unit 200, the slave unit is placed into a low power consumption mode, and periodically recovered therefrom to a normal mode to send connection confirmation request to the master unit 200 in step S44.

(2-2) The processing sequence SEQ$_4$

When confirming a connection at the time the power supply is turned on, if a slave unit which has not been confirmed as being connected has suddenly transmitted a request for confirming a connection, then, the master unit regards that new slave unit as participating in the system, performs necessary internal processing, and provides the other slave units with (latest) connection information which indicates the newly connected slave unit.

In more detail, when the power supply of the audiovisual system is turned on (i.e., when the communication network starts operating or the ACC switch is turned on (FIG. 17 at (a))), the master unit 200 awaits connection confirmation request information as a self report from the slave units 200$_{-1}$-200$_{-n}$ for predetermined period of time t (see step S2 in FIG. 1B and FIG. 17 at (b)). Then, the master unit 200 confirms whether the reception of the connection confirmation request information from all the slave units that were connected when the power supply was turned off in a preceding cycle (i.e., when the communication network stopped operating), e.g., the connection confirmation request information DS$_1$-DS$_3$ from the slave units 200$_{-1}$-200$_{-3}$, is completed or not (see step S4 in FIG. 1B). If the reception of the connection confirmation request information from those slave units is completed, then the master unit 200 operates normally (see step S5 in FIG. 1B). If, however, the connection confirmation request information DS$_3$ has not been reported from the slave unit 200$_{-3}$ within a given period of time t$_1$ since the power supply was turned on in the present cycle, as shown at (e) in FIG. 17, then the master unit 200 extends the reception of connection confirmation request information for an additional period of time t$_2$ (see step S2 in FIG. 1B and FIG. 17 at (b)). Therefore, if the connection confirmation request information DS$_3$ from the slave unit 200$_{-3}$ is received in the period of time t$_2$, then the slave unit 200$_{-3}$ is prevented from being disconnected from the communication bus 14.

The above communication sequence is stored as a control program in the controllers of the master unit 200 and the slave units 200$_{-1}$-200$_{-n}$. The connection statuses of the slave units 200$_{-1}$-200$_{-n}$ at the time the power supply was turned off in the preceding cycle are stored in a RAM in the master unit 200.

(2-3) A sequence to be carried out when the master unit 200 fails:

The processing sequence to be effected upon failure of the master unit 200 is shown in FIG. 18.

The above sequence SEQ$_1$-SEQ$_4$ are carried out insofar as the master unit 200 operates normally.

The slave units 200$_{-1}$-200$_{-n}$ transmit connection confirmation request information D$_{REQ}$ of their own to the master unit 200 in step S100. Thereafter, it is determined whether or not reception acknowledgement information RDT is returned from the master unit 200 to the slave units $200_{-1}$-$200_{-n}$ to acknowledge the reception of the connection confirmation request information. $D_{REQ}$ by the master unit 200 in step S101. If the master unit 200 fails for some reason, the master unit 200 can no longer transmit connection information (including return data to be sent back in response to connection confirmation request information transmitted from the slave units $200_{-1}$-$200_{-n}$) to the slave units $200_{-1}$-$200_{-n}$. If the reception acknowledgement information RDT is returned, then the slave units $200_{-1}$-$200_{-n}$ reset a timer 1 in step S102 and effect an internal process in step S103. Until the timer 1 is over, the internal process is continued. After elapse of a fixed period of time set by the timer 1 in step S104, a timer 2 is reset in step S105. After elapse of a fixed period of time set by the timer 2 in step S106, the slave units $200_{-1}$-$200_{-n}$ transmit the connection confirmation request information $D_{REQ}$ again. Thus, the slave units $200_{-1}$-$200_{-n}$ periodically transmit the connection confirmation request information $D_{REQ}$ to confirm the connection to the master unit 200. If the reception acknowledgement information RDT is not returned to the slave units $200_{-1}$-$200_{-n}$ in step S101, after elapse of the fixed period of time set by the timer 1 in step S106, a timer 3 is reset in step S108. After a fixed period of time set by the timer 3 has passed, the slave units $200_{-1}$-$200_{-n}$ automatically enter a low power consumption mode in step S109. However, the slave units $200_{-1}$-$200_{-n}$ switches from the low power consumption mode to a transmission mode, that is, a normal operation, to transmit again periodically or at a suitable time the connection confirmation request information in step S100 after elapse of a fixed period of time set by the timer 3 in step S110. The slave units $200_{-1}$-$200_{-n}$ repeat the transmission of connection confirmation request information until the master unit 200 sends back connection information. The repeated transmission of connection confirmation request information allows the audiovisual system to recover reliably. Stated otherwise, the audiovisual system cannot start unless the repeated transmission of connection confirmation request information is carried out.

Figure 19:
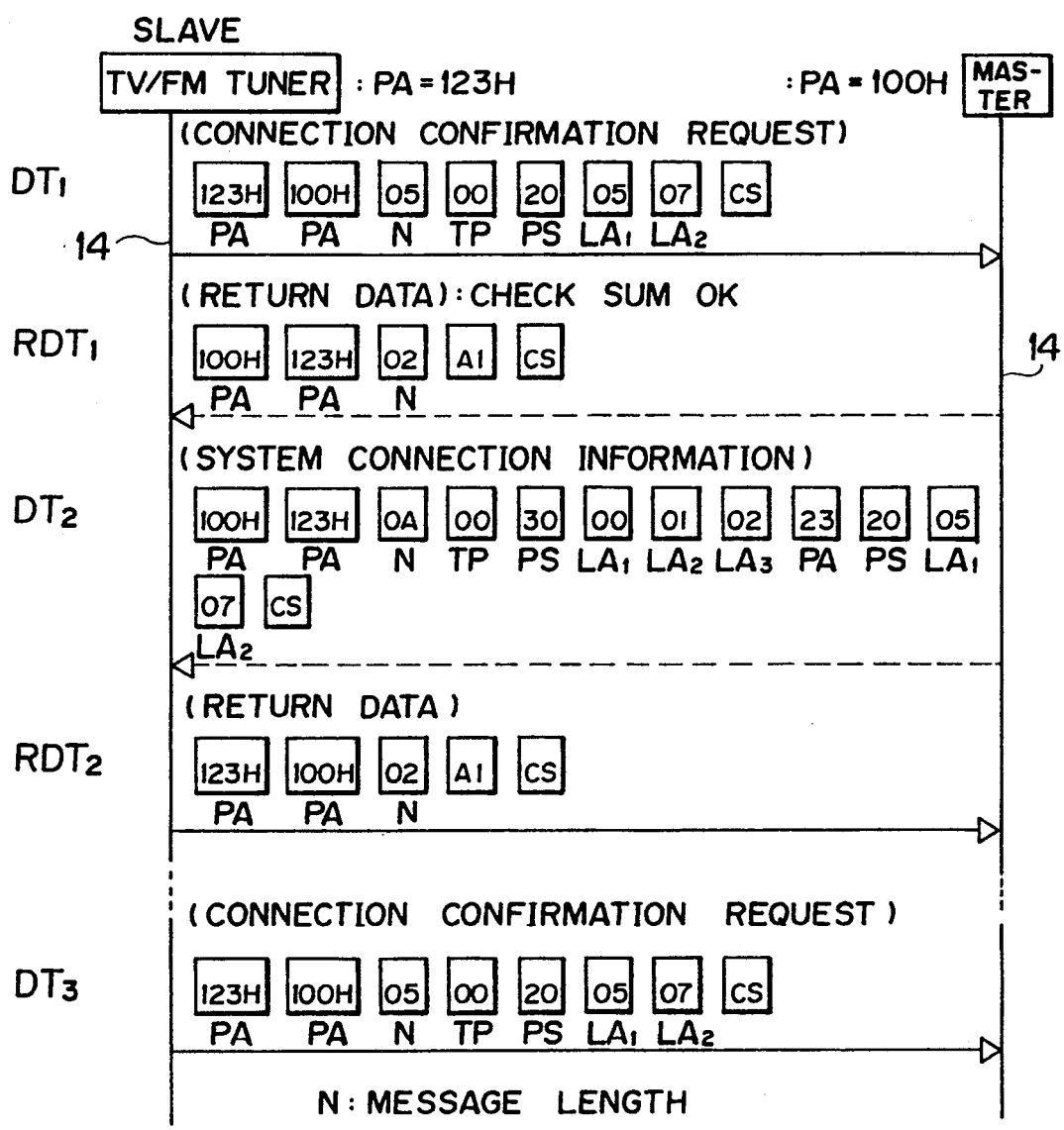
FIG. 19 is a timing chart showing a procedure by which the connection status of slave units is confirmed.

FIG. 19 shows a specific communication process or sequence for confirming a connection when the master unit is accessed by a slave unit including TV and FM/AM tuners to confirm the connection of the slave unit to the audiovisual system.

First, the slave unit transmits communication data $DT_1$ for requesting the confirmation of a connection by way of a self report, to the master unit through the communication bus 14. At this time, the communication data $DT_1$ includes its own physical address data PA indicated by "123H" ("H" means the hexadecimal notation), physical address data PA of the master unit, indicated by "100H", logical address data $LA_1=05$ and logical address data $LA_2=07$, which indicate that the slave unit transmitting the communication data includes the TV and FM/AM tuners (see FIG. 13). When the communication data $DT_1$ is received, the master unit M registers, based on the physical address data PA=123H, the fact that the components with the functions indicated by $LA_1=05$, $LA_2=07$ are connected to the communication bus 14. These components will hereinafter be handled as audiovisual system members. In response to the received communication data $DT_1$, the master unit transmits return data $RDT_1$ back to the slave unit, indicating that the master unit has received the communication data $DT_1$. Then, in order to let the newly connected slave unit know the members or components of the audiovisual system, the master unit transmits system connection information $DT_2$ to the slave unit. When the system connection information $DT_2$ is received, the slave unit transmits return date $RDT_2$ back to the master unit to confirm the reception of the system connection information $DT_2$. After elapse of a predetermined period of time, the slave unit transmits communication data $DT_3$ concerning a request for confirming a connection (self report) again to the master unit. The communication data $DT_3$ is transmitted again because the connection must be confirmed periodically since the audiovisual system on the automobile is turned on and off depending on the ACC switch.

As described above, the communication data DT includes the physical address data PA and the logical address data LA, and the physical address data PA and the logical address data LA are independent of each other. Therefore, any desired combination of physical and logical address data PA, LA may be employed to transmit communication data to any desired unit.

While communication between slave and master units has been described above, it is also possible to transmit communication data between slave units.

As described above, the format of the communication data DT and the allotment of addresses to the units are different between the physical address data PA and the logical address data LA. As a consequence, even if physical address data PA is unknown, a new unit can be connected and can communicate with existing units provided logical address data LA are clearly established.

More specifically, as shown in FIG. 20, it is assumed that a new slave unit $200_{-m}$ is connected to the communication bus 14. Even if the physical address data PA of the slave unit $200_{-m}$ is "101" which is not assumed, provided the function of the slave unit is a display function, the same function registered in the master unit 200 exists as logical address data LA=01, and hence the logical address data LA can be accessed. Therefore, it is possible to connect the slave unit $200_{-m}$ to the master unit 200. The capability of the audiovisual system to expand itself is thus increased.

Although certain preferred embodiments of the present invention have been shown and described in detail, it should be understood that various changes and modifications may be made therein without departing from the scope of the appended claims.

What is claimed is:

1. A method of data communication in a communication network, which occasionally starts and stops operating cycles, on an automobile, including a master unit and at least one slave unit which are connected to a common communication bus, said method comprising the steps of:

transmitting connection confirmation request information on said common communication bus from one slave unit to the master unit each time the communication network starts an operating cycle;

controlling the master unit to await connection confirmation request information from said one slave unit for a predetermined period of time after the communication network starts an operating cycle; and extending said predetermined period of time if reception of connection confirmation request information by said master unit from a slave unit that was connected when the communication network stopped operating in a cycle of operation immediately previous to said operating cycle is not completed.

2. A method according to claim 1, wherein said master unit transmits reception acknowledgement information to the one slave unit in response to reception of the connection confirmation request information from the one slave unit if said master unit is in a status to be properly connected to said one slave unit and function in the communication network, and said one slave unit is controlled so as to enter a low power consumption mode if said one slave unit receives no reception acknowledgement information from said master unit for a predetermined duration of time after said one slave unit transmits confirmation request information if the master unit is not in a status to be properly connected and function in the communication network.

3. A method according to claim 2, wherein said one slave unit is periodically recovered from said low power consumption mode to a normal mode to transmit connection confirmation request information to said master unit.

4. A method according to claim 1 further comprising the steps of: registering a slave unit which has transmitted connection confirmation request information in said master unit, and providing the registered slave with connection information.

5. A method according to claim 1, wherein said master unit periodically tests to detect whether or not connection confirmation request information is transmitted from a slave unit thereby to confirm the connection status of said tested slave unit periodically during a predetermined interval of time while said master unit awaits connection confirmation request information, said predetermined interval of time being less than said predetermined period of time.

6. A method according to claim 5, wherein said communication network starts operating when said communication network is energized.

7. A method according to claim 5, wherein said master unit regards a slave unit having sent no connection confirmation request information as being disconnected and allows a slave unit having newly sent connection confirmation request information to participate in the communication network.

8. A method in accordance with claim 1, wherein said master unit comprises a master controller and a communication interface including a communication control IC and a communication driver/receiver and each slave unit comprises a slave controller and a communication interface including a communication control IC and a communication driver/receiver formed separately from each other.

9. A method according to claim 8, wherein said communication bus comprises a CMOS transistor and said communication driver/receiver comprises a bipolar transistor of high current-driven capability.

10. A method in accordance with claim 1, wherein said communication bus comprises an optical communication cable and said master unit comprises a master controller and a communication interface including a communication control IC and an electro-optical transducer and each slave unit comprises a slave controller and a communication interface including a communication control IC and an electro-optical transducer formed separately from each other.

11. The method according to claim 1, wherein said connection confirmation request information comprises a physical address of the at least one slave unit, a physical address of the master unit, at least one logical address indicating a function with which the at least one slave unit is provided, connection confirmation data and check sum data.

* * * * *